June 25, 1968  D. R. PLUMMER  3,389,632
DOUBLE INVERTED IMAGE OPTICAL ALIGNMENT TESTING APPARATUS
Filed April 20, 1964  2 Sheets-Sheet 1
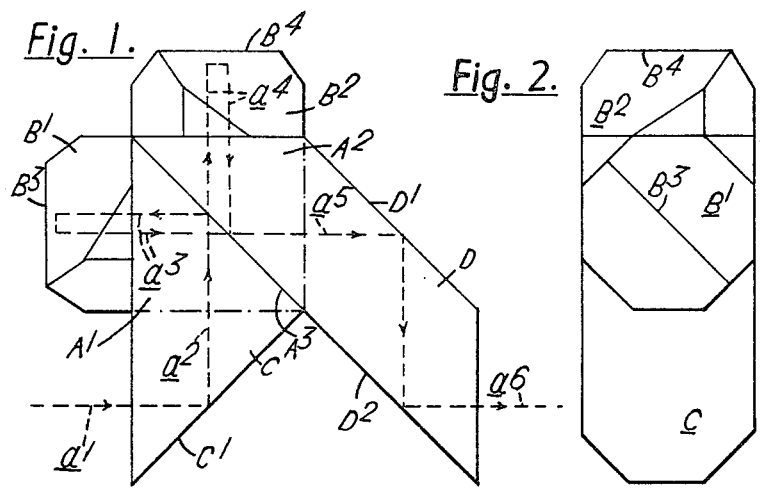
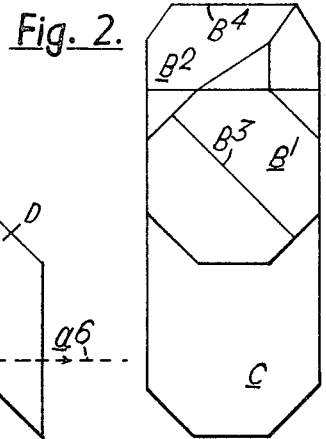
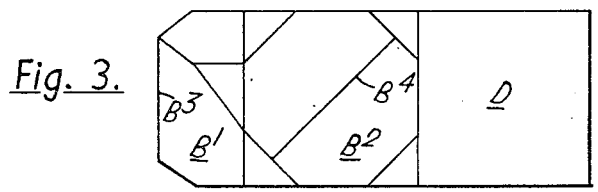
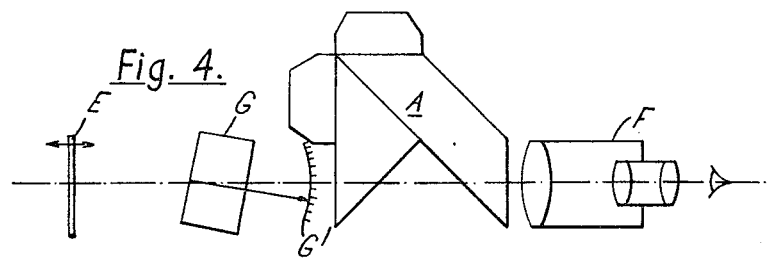
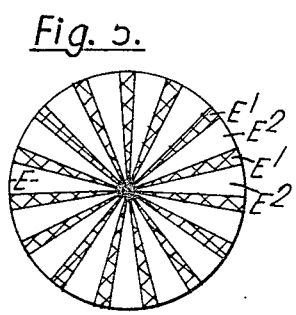
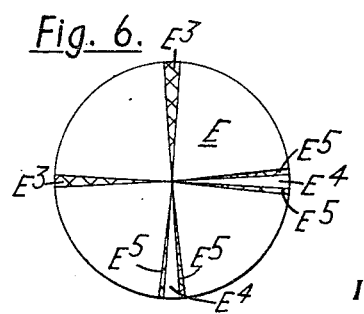
Inventor
D. R. Plummer
By
Attorneys June 25, 1968  D. R. PLUMMER  3,389,632
DOUBLE INVERTED IMAGE OPTICAL ALIGNMENT TESTING APPARATUS
Filed April 20, 1964  2 Sheets-Sheet 2
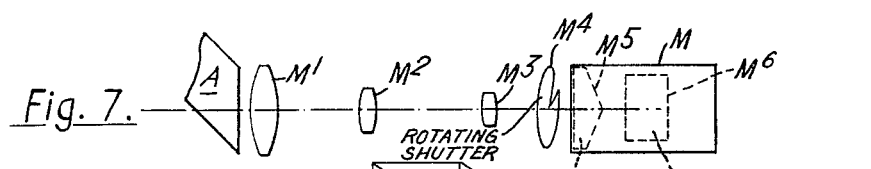
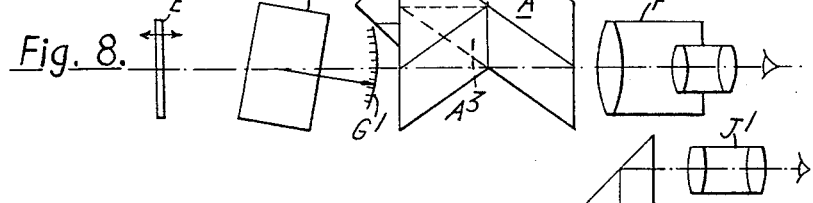
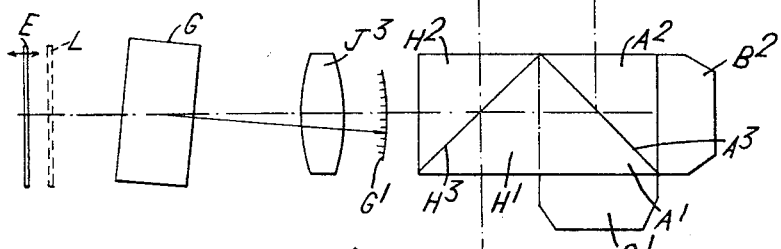
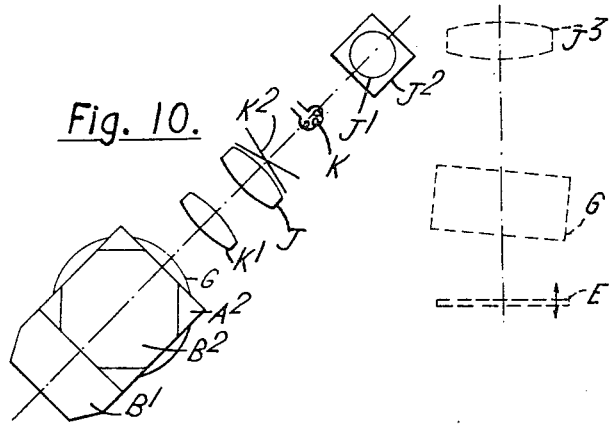
Inventor
D. R. Plummer
By
Attorney

United States Patent Office 3,389,632
Patented June 25, 1968

3,389,632
DOUBLE INVERTED IMAGE OPTICAL
ALIGNMENT TESTING APPARATUS
Dexter R. Plummer, Leicester, England, assignor to Rank Precision Industries Limited, trading as The Rank Organisation, Rank Taylor Hobson Division, Leicester, England, a British company
Filed Apr. 20, 1964, Ser. No. 361,087
Claims priority, application Great Britain, Apr. 23, 1963, 15,962/63
10 Claims. (Cl. 88—14)

ABSTRACT OF THE DISCLOSURE

This invention relates to an optical beam splitter for alignment testing wherein a polarizing semi-reflector is used to form two polarizing beams on axes at right angles and two roof prisms are used to return the polarized beams to the semi-reflector after rotating the planes of polarization of said beams by 90 degrees, whereby two coincident exit beams are formed which are respectively inverted about planes at right angles, the arrangement having the advantage of being a unitary structure wherein loss of light is substantially avoided.

---

This invention relates to optical apparatus for testing squareness or alignment, and more particularly to an optical image-splitting system for this purpose and to optical apparatus incorporating such image-splitting system.

In a known optical image-splitting system, a semi-reflector constituted by a metallic film has been employed, to form two beams on axes mutually at right angles, together with optical means for inverting the initially reflected and the initially transmitted beams respectively about two axes mutually at right angles and for returning such inverted beams to the semi-reflector. In this way two exit beams on a common axis are obtained, and may be utilised to form two superimposed images angularly displaced relative to one another by 180 degrees. The disadvantage of this arrangement is that due to absorption losses at the metallic semi-reflector, and also due to the obtaining of two unwanted exit beams on a common axis at right angles to that of the first two exit beams, the useful light contained by such first two exit beams is an undesirably small fraction of that contained in the beam initially incident on the semi-reflector.

The above-described image-splitting system possesses an optical axis uniquely defined by the intersection of the virtual images, as seen from the entrance side, of the axes about which the initially reflected and initially transmitted beams are respectively inverted the said optical axis being normal to the plane containing said virtual images. The system may thus usefully be employed for testing squareness or alignment in conjunction with an illuminated object, the changes in position of the two angularly separated images of such object, as seen through such image-splitting system, affording a measure of the lack of squareness of the object relative to the axis of the system or the lack of collinearity of various positions of the object, when moved nominally parallel to such axis.

The object of the present invention is to provide an optical image-splitting system, and optical testing apparatus incorporating such system, wherein the disadvantage of the known system as regards loss of light is substantially avoided.

The optical image-splitting system, according to the present invention, comprises a dielectric semi-reflector producing, from a beam of light incident thereon at an angle of 45 degrees, a reflected beam and a transmitted beam on axes mutually at right angles with the reflected beam polarised in the plane at right angles to the plane of polarisation of the transmitted beam, optical means for reflecting the initially reflected and the initially transmitted beams through 180 degrees to return such beams to the semi-reflector and for rotating the planes of polarisation of the beams through 90 degrees so that substantially the whole of the initially reflected beam is transmitted and substantially the whole of the initially transmitted beams is reflected on such return to the semi-reflector, thereby to give rise to two exit beams leaving the semi-reflector on a common axis at right angles to the axis of the incident beam, the optical means also acting to invert the initially reflected and the initially transmitted beams respectively about two axes mutually at right angles so that the exit beams may be utilised to form two superimposed images angularly displaced relative to one another by 180 degrees.

In contrast with the known arrangement, this image-splitting system not only substantially avoids the undesired exit of light from such system in a second direction, but also by use of a dielectric semi-reflector minimises loss of light due to absorption.

The optical means is preferably constituted, at least in part, by a pair of roof reflectors respectively for receiving the initially reflected and the initially transmitted beams, the angles between the roof edges of such roof reflectors and the common plane containing the axes of the initially reflected and the initially transmitted beams being complementary. Thus, in a preferred arrangement, the optical means is constituted by a pair of roof reflectors whose roof edges each lie at 45 degrees to the common plane containing the axes of the initially reflected and the initially transmitted beams. In this way, the roof reflectors act not only to invert the initially reflected and the initially transmitted beams, but also to rotate their planes of polarisation through 90 degrees. In other instances, additional optical means may be provided to effect or to assist in effecting rotation of the planes of polarisation of the beams. For example, when the roof edges of the roof reflectors respectively lie in and at right angles to the common plane of the initially reflected and the initially transmitted beams, such roof reflectors effect no change in the planes of polarisation of such beams, and additional means are provided for this purpose. It will be realised that in the last mentioned example the roof edges of the roof reflectors lie at right angles to one another, but in other instances such roof edges constitute skew lines lying at other angles to one another, for example 60 degrees in the preferred arrangement. However, in all cases, the virtual images of the roof edges as seen looking into the image-splitting system are mutually at right angles.

The semi-reflector is preferably constituted by a dielectric film at the internal surface of a diagonally-split rectangular prism. In this instance, when the optical means is constituted, at least in part, by a pair of roof reflectors, these may conveniently comprise the roof surfaces of a pair of roof prisms respectively mounted on the two faces of the rectangular prism which receive the initially reflected and the initially transmitted beams.

It may sometimes be inconvenient for the exit beams to emerge along an axis at right angles to the beam entering the image-splitting system. In this case, the incident beam may conveniently be received by the semi-reflector after reflection as an entrance beam at a reflector lying at right angles to such semi-reflector, whereby the axis of the exit beams lie parallel to the axis of such entrance beam. For example, such reflector may be a total reflector formed at the hypotenuse surface of a right-angled prism integrally formed with the rectangular prism. In addition, if desired, the exit beams from the semi-reflector may be twice reflected at total reflectors, lying parallel to such semi-reflector, to emerge on an axis coaxial with that of the entrance beam. For example, such total reflectors for the exit beams may be formed at the opposite surfaces of a 45 degree parallelogram prism integrally formed with the rectangular prism.

In one convenient arrangement, the incident beam is received by the semi-reflector after transmission or reflection at a supplementary semi-reflector lying at right angles to the first semi-reflector, such supplementary semi-reflector being for use in an optical collimator wherein the collimated beam is first reflected or transmitted at such supplementary semi-reflector and then returned thereto from a remote mirror. For example, such semi-reflector may be constituted by a non-polarising film at the internal surface of a diagonally-split rectangular prism integrally formed with the diagonally-split rectangular prism which accommodates the first semi-reflector.

A further feature of the present invention relates to optical apparatus for testing squareness or alignment and incorporating the above-described image-splitting system. Such apparatus comprises an illuminated object, and an optical image-splitting system as above-described through which the object is sighted from a sighting device for receiving the two exit beams from the image-splitting system and for defining a nominal line of sight relative to which the positions of two target images respectively formed by such exit beams may be measured. For example, in one arrangement for testing alignment, the object comprises an illuminated target movable to a number of nominally collinear positions, and the optical image-splitting system is mounted with its axis parallel to the nominal direction of movement of such illuminated target. Conveniently, in this arrangement, the target may be formed with a plurality of alternate light and dark sectors, the boundaries between adjacent sectors being radial with respect to the centre of the target, and the image-splitting system being mounted so that its axis is collinear with the nominal direction of movement of such target centre. This has the advantage that, apart from changes due to non-collinearity of the target positions, the target images appear the same, as seen through the image-splitting system, at all distances up to a maximum depending only on the size of the target.

The sighting device may for example comprise a focusing telescope, but alternatively measurements may be effected photo-electrically, using a sectored target as above described. In this case, in addition to an optical objective, the sighting device includes a photoelectric receiver incorporating a shutter mounted for rotation about the nominal line of sight and having one or more sectors which constitute an eccentric aperture or apertures, whereby the output of the photo-electric receiver incorporates a signal dependent in magnitude and phase on the positions of the target images relative to the line of sight.

The sighting device will usually be mounted so that the nominal line of sight is collinear with the axis of the image-splitting system.

An alternative arrangement of apparatus especially for use in testing squaring comprises a source of light, an optical collimator, and an image-splitting system as previously described having a supplementary semi-reflector, which semi-reflector first recives the collimated beam to transmit or to reflect such beam to an object mirror and subsequently recives the return beam for reflection or transmission before image splitting. This arrangement may be combined with the above-described arrangement for testing alignment, if desired using a common sighting device for the two test purposes.

An optical deviating plate may be provided by tilting of which the object images may be displaced relative to the nominal line of sight. Usually, the apparatus will include two such deviating plates tiltable about axes at right angles, whereby the displacement of the object can be measured in two coordinate directions.

Preferably, in the optical testing apparatus, the optical image-splitting system is mounted so that the optical means acts to invert the beams from the semi-reflector respectively about the horizontal and vertical axes. With the preferred arrangement, this means that the virtual images of the roof edges of the roof reflectors, as seen looking into the image-splitting system, appear vertical and horizontal respectively.

The invention may be carried into practice in various ways but some practical arrangements of optical image-splitting system and optical testing apparatus incorporating such system according to the invention will now be described by way of example with reference to the accompanying drawings, in which FIGURES 1, 2 and 3 respectively show a practical construction of image-splitting prism in side elevation, in front elevation and in plan, FIGURE 4 shows a practical arrangement of optical apparatus for testing alignment and incorporating the image-splitting prism, FIGURES 5 and 6 respectively show alternative forms of target for use in the alignment testing apparatus, FIGURE 7 shows a modified sighting device for the alignment testing apparatus, FIGURE 8 shows a preferred modification of the alignment testing apparatus, and FIGURES 9 and 10 show a preferred arrangement of optical apparatus for testing squaring and alignment, respectively viewed in a 45 degree downwardly inclined direction from the side and in a horizontal direction from the rear.

In the arrangement of FIGURES 1–3 the image-splitting system is in the form of a compound prism. The basis of such prism arrangement is a cube of optical glass which will be assumed to be orientated with its face horizontal and vertical, and these faces will be termed, front, rear, top, bottom and side faces for the convenience of description. The cube is formed by two prism parts $A^1$ and $A^2$ diagonally splitting such cube from the edge between its front and top faces to the edge between its rear and bottom faces. The two prism parts $A^1$ and $A^2$ are cemented together with an intervening dichroic coating at the cube diagonal $A^3$. This coating constitutes a semi-reflector, so that a vertical beam $a_2$ of light from below, which is incident thereon at an angle of 45 degrees, is split into two beams, one beam $a^4$ being transmitted in the vertical direction towards the top face of the cube $A^1$, $A^2$ and one beam $a^3$ being reflected forwardly towards the front face of the cube. Very little light is lost by absorption at such a dielectric coating, and such coating is formed within limits of practice so as to reflect and to transmit substantially equal portions of the incident beam $a^2$ and to plane polarise the reflected beam $a^3$ in one plane and the transmitted beam $a^4$ in the plane at right angles thereto. The axes of the reflected and transmitted beams lie in a common plane parallel to the side faces of the cube $A^1$, $A^2$.

Cemented on the front and top faces of the cube $A^1$, $A^2$ respectively are two roof prisms $B^1$ and $B^2$, having totally reflective roof surfaces, one for receiving the beam reflected at the semi-reflector $A^3$ and one for receiving the beam transmitted at the semi-reflector. Each roof prism $B^1$ or $B^2$ is orientated with its roof edge $B^3$ or $B^4$ at 45 degrees to the vertical plane containing the axes of the beams initially reflected and initially transmitted at the semi-reflector, the hypotenuse faces of such proof prisms being parallel to the front and top faces of the cube $A^1$, $A^2$ respectively. The roof edges $B^3$ and $B^4$ of such roof prisms $B^1$ and $B^2$ thus constitute skew lines lying at an angle of 60 degrees with one another, but the virtual images of such roof edges, as seen looking into the compound prism, are mutually at right angles. The roof prisms $B^1$ and $B^2$ act not only in a conventional manner to invert the initially reflected beam $a^3$ and the initially transmitted beam $a^4$ and to return such beams along their axes to the semi-reflector $A^3$, but also to rotate the planes of polarisation of such beams through 90 degrees. For this reason, on such return to the semi-reflector $A^3$, substantially the whole of the initially reflected beam $a^3$ is transmitted and substantially the whole of the initially transmitted beam $a^4$ is reflected. Thus, two exit beams $a^5$ on a common axis are obtained, this axis being collinear with that of the initially reflected beam $a^3$ and therefore at right angles to the axis of the beam $a^2$ incident on the semi-reflector initially. The exit beams $a^5$ emerge towards the rear face of the cube, and remain inverted, respectively about two axes at right angles, as defined by the virtual images of the roof edges $B^3$ and $B^4$ as seen looking into the compound prism. The exit beams $a^5$ are of substantially equal strength, the total light content of such beams being relatively little less than the amount of light contained in the beam $a^2$ initially incident on the semi-reflector $A^3$.

If desired, as for convenience also shown in FIGURES 1 to 3, the beam $a^2$ incident on the semi-reflector $A^3$ may be arranged to enter the compound prism from the front, being first incident on a 45 degrees total reflector. For this purpose, the prism part $A^1$ beneath the semi-reflector $A^3$ is formed with an integral extension C on the bottom face of the cube $A^1$, $A^2$, such extension being a right-angled isosceles triangle in vertical section. The hypotenuse face $C^1$ or rear face of such extension lies at right angles to the semi-reflector and is made totally reflecting. The front face of such extension C lies in a vertical plane, being coplaner with the front face of the cube $A^1$, $A^2$, so that the entrance beam $a^1$ passes through such face without undergoing refraction. Conveniently, the prism part $A^2$ above the semi-reflector $A^3$ may also be formed with an integral extension D by means of which the exit beams $a^5$ emerge rearwardly as beams $a^6$ on an axis collinear with the axis of the entrance beam $a^1$. This extension D is formed on the rear face of the cube $A^1$, $A^2$ and is a 45 degree parallelogram in vertical section, its upper and lower surfaces $D^1$ and $D^2$ being respectively parallel to and coplanar with the semi-reflector $A^3$. These surfaces $D^1$ and $D^2$ of such second extension D are also made totally reflecting, so as twice to reflect the exit beams, first downwardly and then rearwardly again. The rear face of the parallelogram extension D lies in a vertical plane so as not to cause refraction of the coaxial beams $a^6$ emergent from the compound prism.

From the above description, it will be apparent that, whether or not the extensions C and D are provided, the compound prism is made up of four glass elements, two of which are constituted by the roof prisms $B^1$ and $B^2$. Of the other two elements in the arrangement described having the extensions C and D, one is an element constituting the parts $A^1$ and C in integral combination and being triangular in vertical section, its hypotenuse face forming the front face of the cube $A^1$, $A^2$ and in continuation thereof the entrance face of the extension C beneath such cube and its other two faces forming the diagonal interface $A^3$ of the cube and the total reflector $C^1$ for the entrance beam respectively. The fourth element constitutes the parts $A^2$ and D in integral combination and is trapezoidal in vertical section, the lower of its two parallel faces forming the diagonal interface $A^3$ of the cube $A^1$, $A^2$ and in continuation thereof the second total reflector $D^2$ for the exit beams, the upper of its two parallel faces forming the first total reflector $D^1$ for the exit beams, and its other two faces forming the top face of the cube and the exit face of the rearward extension D of the cube.

The prism has an optical axis defined by the intersection of the virtual images, as seen at entrance, of the axes about which the initially reflected and the initially transmitted beams $a^3$ and $a^4$ are respectively inverted the said optical axes being normal to the plane containing said virtual images. Thus, a point source of light on such optical axis in front of the entrance face of the prism is seen through the prism as a single point image, but a point source located off such axis appears through the prism as a double image, the two images being angularly separated by 180 degrees since the beams $a^6$ forming such images are respectively inverted about axes at right angles. The fact that the prism gives rise to a double image except for points on the axis renders such prism readily suitable for use in detecting non-alignment of a number of nominally collinear points on a line parallel to or coaxial with the axis of such prism. Furthermore, the relative position of the two images formed due to such an off axis source affords a measure of the non-alignment in two coordinate directions, as determined by the axes about which the initially reflected and the initially transmitted beams $a^3$ and $a^4$ are inverted.

In the practical arrangement of alignment testing apparatus shown in FIGURE 4 an illuminated target E is employed, such target being movable to a number of nominally collinear positions. A convenient target is divided into light and dark sectors alternately, so that all boundaries between such sectors are radial lines. For example, as shown in FIGURE 5, such target E may have 15 dark sectors $E^1$ each extending over 6 degrees, alternating with 15 light sectors $E^2$ each extending over 18 degrees. An alternative target E, shown in FIGURE 6, has two dark sectors $E^3$ each of 5 degrees and separated by a light sector of 85 degrees, each such dark sector being diametrically opposite a light sector $E^4$ of 8 degrees contained between two dark sectors $E^5$ of 1 degree. Such target arrangements are advantageous in that when viewed through the image-splitting prism, an arrangement sensitive to small non-alignments is obtained, and also in that the appearance of the target images is the same, apart from changes in non-alignment, up to a maximum distance which depends only on the target size. For the latter reason, it is unnecessary to correct the alignment testing apparatus for aberrations of astigmatism.

The image-splitting prism, indicated generally by the reference A, is mounted with its axis collinear with the nominal direction of movement of the centre of the sectored target E between the nominally collinear test positions, and for viewing the target images a focussing telescope F is employed, preferably of the kind in which is employed a positive focussing lens. For the purpose of setting up, the prism A is carried by an adjustable mounting (not shown) which enables the prism axis to be set collinear with the line through the centre of the target E in the two extreme end positions of the movement of such target, i.e. adjustment is effected so that the target images, as viewed through the telescopes, are aligned with respect to the prism axis for such two end positions of the target. The telescope F increases the sensitivity with which measurements may be effected, such telescope preferably being mounted, as shown, so that its norminal line of sight is coaxial with the axis of the image-splitting prism A. Between the target E and the prism A is mounted an optical deviating plate G tiltable about two axes at right angles, not necessarily corresponding to the planes about which the initially reflected and the initially transmitted beams are inverted, under the control of a pair of operating knobs (not shown). A meter scale for indicating the angle through which the plate G is tilted is illustrated at $G^1$. With this arrangement, when the target E is moved from one test position to another, any degree of non-alignment results in changes in position of the superimposed images seen in the telescope F, which may be measured by tilting the deviating plate G either about one or more usually about both axes, to nullify such changes. The non-alignment of the test positions of the target E may thus be measured relative to the nominal line of sight, in two coordinate directions defined by the axes about which the deviating plate G is titltable. Although only one deviating plate is shown in the drawing, it will often be preferable to employ two such plates, respectively tiltable about axes mutually at right angles, each under the control of a single control knob. The control knobs may be scaled for measurement purposes if desired. It may also be mentioned that whereas the above-described optical deviating plate or plates are preferably employed for measuring relatively small displacements from alignment, from say 0.0001 of an inch up to say 0.05 of an inch in any direction, for larger displacements measurement is preferably effected by offsetting the target.

One modified form of sighting device is shown in FIGURE 7, and comprises an image tube M wherein a photoelectric sensitive area is rotationally scanned to show the target images. The telescope is replaced by an optical objective $M^1$, a focussing lens $M^2$, and an erecting lens $M^3$.

Another modified sighting device for use with the sectored target shown in FIGURE 5 also operates photoelectrically, and again utilizes the objective $M^1$, the focussing lens $M^2$ and the erecting lens $M^3$. As for convenience indicated in broken line in FIGURE 7, in the image plane is located a shutter $M^4$ rotating about the optical axis and having a sector formed as an aperture. Behind such shutter $M^4$ is located a photo-electric device $M^5$. If the target is considered to possess $2n+1$ light sectors, so that, when the target images are located on the line of sight, such double image has $4n+2$ light sectors, the angular size of the aperture in the rotating shutter $M^4$ is arranged to the 360 degrees divided by $8n+4$. Thus, the output of the photo-electric device $M^5$ behind such shutter $M^4$, and whereon is imaged the aperture stop of the system, is modulated at $4n+2$ times the shutter rotation frequency. However, when the target is moved to cause the target double image to be offset from the line of sight, a signal modulated at $2n+1$ times the shutter rotation frequency is contained in the output of the photo-electric device $M^5$. The phase of such modulated signal corresponds to the direction of non-alignment, and can be resolved in two coordinate directions by a conventional phase sensitive demodulator circuit $M^6$, as well understood in the art and therefor indicated only schematically. In the last-described arrangement, the shutter $M^4$ may have two or more apertures of appropriate size if desired.

In the above-described arrangement of optical apparatus it is assumed that the prism A is mounted with the cube $A^1$, $A^2$ (referring again to FIGURES 1 to 3) orientated so that its faces lie in horizontal and vertical planes. With this arrangement, the virtual images of the roof edges $B^3$ and $B^4$ of the roof prisms $B^1$ and $B^2$, as seen looking into the compound prism A, appear as lines mutually at right angles and each inclined at 45 degrees to the vertical. Correspondingly, the inversion of the beam $a^3$ initially reflected at the semi-reflector $A^3$ and the inversion of the beam $a^4$ initially transmitted at such semi-reflector respectively take place about two inclined planes. As regards viewing, this means that a point of the target E vertically above the axis has two off-axis images spaced horizontally on opposite sides of the axis. For the avoidance of this possible disadvantage, a preferred modification of the above-described arrangement is shown in FIGURE 8. This modification differs from the arrangement of FIGURE 4 in that the prism A is rotated through 45 degrees about its axis so that the semi-reflector $A^3$ now lies in a 45 degree skew plane. With this modification, the images of the roof edges $B^3$ and $B^4$ of the roof prisms $B^1$ and $B^2$ appear as horizontal and vertical lines when looking into the compound prism A, and inversion of the split beams $a^3$ and $a^4$ takes place about horizontal and vertical axes. Thus, a point of the target vertically above the axis appears at the sighting device as two vertically spaced point images.

A development of the above-described apparatus is shown in FIGURES 9 and 10 wherein is incorporated a collimator for testing the squareness of a target, constituted by a mirror, relative to the prism axis. The extensions C and D of the prism are omitted, the exit beams emerging at right angles to the entrance beam and being focussed by a lens J on to an eyepiece $J^1$, if desired after reflection at a separate right-angled prism $J^2$. The optical objective $J^3$ is positioned between the prism $A^1$, $A^2$ and the deviating plate G, instead of on the viewing side of the prism as in the previously described arrangements. In the arrangement of FIGURES 9 and 10, the prism is again rotated through 45 degrees about its axis so that, as clearly shown in FIGURE 10, the faces of such prism lie in 45 degree inclined planes. Thus, as in the arrangement of FIGURE 8, a point of the target E vertically above the axis appears at the eyepiece $J^1$ as two vertically spaced point images.

Integrally formed with the prism cube $A^1$, $A^2$ on the entrance face thereof is a second prism cube $H^1$, $H^2$ diagonally split to accommodate at the interface $H^3$ a non-polarising semi-reflecting film lying at right angles to the semi-reflector $A^3$. This extension $H^1$, $H^2$ of the prism $A^1$, $A^2$ normally takes no part in the use of the apparatus for testing alignment, which is effected in the previously described manner, the portion of the beam from the illuminated target E which is transmitted at the semi-reflector $H^3$ being split at the dielectric semi-reflector $A^3$ to give rise to a double image of the illuminated target at the eyepiece $J^1$.

The semi-reflector $H^3$ is provided for use in a collimating system including a source K and a collimating lens $K^1$ mounted on an axis parallel to but spaced from the axis of beams emergent from the prism $A^1$, $A^2$. The collimated beam from the source K is reflected by the semi-reflector $H^3$ along the axis of the prism $A^1$, $A^2$ to a target constituted by a plane mirror L. The return beam from the mirror L is transmitted at the semi-reflector $H^3$ and split into two beams at the semi-reflector $A^3$ to form a double image at the eyepiece $J^1$. A graticule $K^2$ is incorporated in the collimator, and the double images of such graticule received at the eyepiece $J^1$ will be superimposed only if the mirror L lies strictly square, i.e. normal, to the prism axis. For measurement of lack of squareness of the mirror L the deviating plate G is not used, this plate being left strictly normal to the axis so that it has no effect on the beams passing through it. Instead, measurement is effected at the collimator, either by means of a supplementary tiltable deviating plate $K^3$ (indicated in broken line) or by movement of the graticule $K^2$ or by a combination of both such devices, as is well known in the art.

One further point which should be mentioned is that, for testing alignment, it is possible to use the portion of the beam from an illuminated target which is reflected at the supplementary semi-reflector $H^3$ instead of the portion which, as above mentioned, is transmitted at such semi-reflector. It is thus possible, by duplicating the optical objective $J^3$, the deviating plate G and the target E, as indicated in broken line in FIGURE 9, to test alignment in either one of two directions at right angles, the respective tests not being carried out simultaneously. Similarly, by use of a second mirror, the squareness test may be carried out in the second direction at right angles to the axis of the prism $A^1$, $A^2$. In the arrangement described with reference to FIGURES 9 and 10 it will be appreciated that the alignment test and the squareness test are separate tests not effected simultaneously. However, by use of a special construction of target, for example wherein the dark sectors are constituted by areas of light-reflecting coating on a light-transmitting plate, it is possible to illuminate such target from behind to form the illuminated target for alignment testing whilst permitting the reflective sectors to constitute the mirror, when the illumination is switched off, for squareness testing.

It will be appreciated that the above-described arrangements may be modified in various ways within the scope of the invention.

What I claim as my invention and desire to secure by Letters Patent is:

1. In apparatus for testing alignment or squareness, an optical image splitting system comprising a first glass element; a second glass element forming a plane interface with the first element; a dielectric semi-reflecting layer at the interface of said first and second elements for producing, from a light beam incident thereon at an angle of 45 degrees, a reflected beam and transmitted beam on axes mutually at right angles and respectively plane polarized, one having its axis of polarization in the plane containing said axes and one in a plane normal thereto; a third glass element in the form of a roof prism having fully reflecting roof surfaces; means mounting said roof prism on the first element to receive the beam transmitted through the semi-reflecting layer with its roof edge intersecting the axis of the transmitted beam and lying at an angle of about 45 degrees to the plane of polarization of said transmitted beam; a fourth glass element in the form of a roof prism having fully reflecting roof surfaces; and means mounting such second roof prism on the second element to receive the beam reflected from the semi-reflecting layer with its roof edge intersecting the axes of the reflected beam and lying at an angle of about 45 degrees to the plane of polarization of said reflected beam; said elements being secured together to form a unitary light-transmitting structure giving rise to two co-incident exit beams respectively inverted with respect to the incident beam, about two axis at right angles to each other.

2. An optical image-splitting system as claimed in claim 1 comprising a supplementary semi-reflector lying at right angles to said dielectric semi-reflecting layer and positioned to receive the incident beam and partially reflect it along the axis of said transmitted beam.

3. An optical image-splitting system as claimed in claim 1 comprising a total reflector lying at right angles to said dielectric semi-reflecting layer and positioned to reflect an entrance beam to said dielectric semi-reflective layer so that the axis of the exit beam lies parallel to that of said entrance beam, said total reflector being formed at the hypotenuse surface of a right-angled prism formed integrally with said first and second glass elements.

4. Optical apparatus for testing squareness or alignment including an optical image-splitting system comprising a first glass element; a second glass element forming a plane interface with the first element; a dielectric semi-reflecting layer at the interface of said first and second elements for producing, from a light beam incident thereon at an angle of 45 degrees, a reflected beam and transmitted beam on axes mutually at right angles and respectively plane polarized, one having its plane of polarization in the plane containing said axes and one in a plane normal thereto; a third glass element in the form of a roof prism having fully reflecting roof surfaces; means mounting said roof prism on the first element to receive the beam transmitted through the semi-reflecting layer with its roof edge intersecting the axis of the transmitted beam and lying at an angle of about 45 degrees to the plane of polarization of said transmitted beam; a fourth glass element in the form of a roof prism having fully reflecting roof surfaces; means mounting such second roof prism on the second element to receive the beam reflected from the semi-reflecting layer with its roof edge intersecting the axes of the reflected beam and lying at an angle of about 45 degrees to the plane of polarization of said reflected beam; said elements being secured together to form a unitary light-transmitting structure giving rise to two coincident exit beams respectively inverted with respect to the incident beam, about two axes at right angles to each other; an illuminated object; and a sighting device through which the object is sighted through the optical image-splitting system, said sighting device defining a nominal line of sight relative to which the positions of the two tangent images, respectively formed by the exit beams, may be measured.

5. An optical image-splitting system as claimed in claim 2 in which said first and second glass elements form a first diagonally split rectangular prism accommodating said dielectric semi-reflecting layer and the supplementary semi-reflector is constituted by a non-polarising film at the internal surface of a diagonally-split rectangular prism integrally formed with said first diagonally-split rectangular prism.

6. An optical image-splitting system as claimed in claim 3 comprising two total reflectors lying parallel to said reflecting layer so positioned that the exit beams from the semi-reflecting layer are twice reflected, once by each of said reflectors, to emerge on an axis coaxial with that of the entrance beam, said total reflectors for the exit beams being formed at the opposite surfaces of a 45 degree parallelogram prism integrally formed with said first and second glass elements.

7. Optical testing apparatus as claimed in claim 4 in which the object comprises an illuminated target movable to a number of positions, and the optical image-splitting system is mounted with its axis parallel to the direction of movement of such illuminated target.

8. Optical testing apparatus as claimed in claim 7 in which the target is formed with a plurality of alternate light and dark sectors, the boundaries between adjacent sectors being radial with respect to the centre of the target, and the image-splitting system being mounted so that its axis is collinear with the direction of movement of such target centre.

9. Optical testing apparatus as claimed in claim 8 in which the sighting device includes a photo-electric receiver incorporating a shutter mounted for rotation about the nominal line of sight and having one or more sectors which constitute an eccentric aperture or apertures, whereby the output of the photo-electric receiver incorporates a signal dependent in magnitude and phase on the positions of the target images relative to the line of sight.

10. Optical alignment testing apparatus as claimed in claim 4 including an optical deviating plate by tilting of which the object images may be displaced relative to the nominal line of sight.

References Cited

UNITED STATES PATENTS

| | | | |
|---|---|---|---|
| 2,055,684 | 9/1936 | Eppenstein | 88—14 X |
| 2,432,432 | 12/1947 | MacNeille | 350—173 X |
| 3,114,842 | 12/1963 | Davidson | 88—14 X |

FOREIGN PATENTS 1,258,676  3/1961  France.

OTHER REFERENCES

King et al., Sensitive Method for the Measurement of Small Rotations. V. of Sci. Inst., vol. 36, December 1959, pp. 507–509.

JEWELL H. PEDERSEN, *Primary Examiner.*

A. A. KASHINSKI, *Assistant Examiner.*